(12) United States Patent
Yoon et al.

(10) Patent No.: US 12,009,566 B2
(45) Date of Patent: Jun. 11, 2024

(54) FOUR-WAY POWER DIVIDER AND COMBINER FOR PHASED ARRAY SYSTEM

(71) Applicant: Samsung Electronics Co., Ltd., Suwon-si (KR)

(72) Inventors: Youngchang Yoon, Suwon-si (KR); Kyuhwan An, Suwon-si (KR); Bohee Suh, Suwon-si (KR); Sangho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 263 days.

(21) Appl. No.: 17/421,188

(22) PCT Filed: Jan. 6, 2020

(86) PCT No.: PCT/KR2020/000166
§ 371 (c)(1),
(2) Date: Jul. 7, 2021

(87) PCT Pub. No.: WO2020/145586
PCT Pub. Date: Jul. 16, 2020

(65) Prior Publication Data
US 2022/0059920 A1    Feb. 24, 2022

(30) Foreign Application Priority Data

Jan. 9, 2019    (KR) .................... 10-2019-0002653

(51) Int. Cl.
*H01P 5/16*       (2006.01)
*H04B 1/38*      (2015.01)

(52) U.S. Cl.
CPC ............. *H01P 5/16* (2013.01); *H04B 1/38* (2013.01)

(58) Field of Classification Search
CPC .... H01P 5/16; H01P 5/12; H04B 1/38; H04B 1/0458
See application file for complete search history.

(56) References Cited

U.S. PATENT DOCUMENTS

| 4,367,445 A | 1/1983 | Dydyk |
| 5,469,129 A | 11/1995 | Dydyk |

(Continued)

FOREIGN PATENT DOCUMENTS

| CN | 103022619 A | 4/2013 |
| JP | 3759519 B2 | 3/2006 |

(Continued)

OTHER PUBLICATIONS

Kim et al.; Miniature Four-Way and Two-Way 24 GHz Wilkinson Power Dividers in 0.13 um CMOS; IEEE Microwave and Wireless Components Letters; vol. 17, No. 9; IEEE; Sep. 2007.

(Continued)

*Primary Examiner* — Angelica Perez
(74) *Attorney, Agent, or Firm* — Jefferson IP Law, LLP

(57) ABSTRACT

Disclosed is a 5G or pre-5G communication system for supporting a data transmission rate higher than that of a 4G communication system such as LTE. The present invention relates to a technique for implementing, in a compact form, a four-way power divider and combiner for a phased array system. More particularly, according to one embodiment of the present invention, a power divider including one input port and four output ports comprises an input terminal inductor having one end connected to the input port and the other end connected to the ground, an inductor group including four output terminal inductors, and four connection units for connecting the input port and the inductor group, wherein four secondary inductors are respectively connected to the four connection units so that four nodes are formed between the four connection units and the inductor group, and the output ports are respectively disposed on the four connection units between the input port and the inductor group.

12 Claims, 11 Drawing Sheets

(56) References Cited

U.S. PATENT DOCUMENTS

| | | | |
|---|---|---|---|
| 7,492,239 B1 | 2/2009 | Sarkees | |
| 9,246,444 B2 | 1/2016 | Hase et al. | |
| 10,652,065 B2* | 5/2020 | Sarkas | H04L 27/2614 |
| 2009/0273413 A1* | 11/2009 | Zhang | H03H 7/48 |
| | | | 333/124 |
| 2014/0292441 A1 | 10/2014 | Takei | |
| 2017/0163237 A1* | 6/2017 | Lee | H03H 7/46 |

FOREIGN PATENT DOCUMENTS

| | | |
|---|---|---|
| KR | 10-1602440 B1 | 3/2016 |
| KR | 10-2017-0066915 A | 6/2017 |

OTHER PUBLICATIONS

Korean Office Action dated Oct. 12, 2023, issued in Korean Application No. 10-2019-0002653.

\* cited by examiner (a)

(b)

(a)

(b)

FOUR-WAY POWER DIVIDER AND COMBINER FOR PHASED ARRAY SYSTEM

TECHNICAL FIELD

The disclosure relates to a technique for configuring a four-way power divider and combiner for a phased array system in a compact form.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

To provide various mobile communication services, a phased array system that divides one signal into a plurality of signals having different directions and transmits the signals or receives a plurality of signals having different directions and combines the signals into one signal may be applied. The phased array system may use a power divider and a power combiner to divide one signal or to combine a plurality of signals into one signal.

A power divider is a circuit that divides input power according to a predetermined ratio and distributes the power to output ports in a radio-frequency (RF) circuit in a mobile communication terminal or the like, and distributes power according to a desired ratio without power loss and isolates the output ports from each other to reduce the influence of the ports on each other, thereby preventing a characteristic change of the circuit. The power divider can be used as a power combiner by switching input and output ports of the power divider.

The power divider or combiner may be configured with a device, such as an inductor or a capacitor, in order to distribute power without power loss and to reduce the influence of ports on each other. However, an inductor has a large size, and thus occupies a large space when used to configure an array system to transmit and receive signals in a plurality of directions in a phased array system, making it impossible to configure the power divider and the power combiner so as to occupy a small volume.

DETAILED DESCRIPTION OF INVENTION

Technical Problem

An aspect of the disclosure is to provide a four-way power divider and combiner that are configured to be compact.

Solution to Problem

To achieve the foregoing aspect, a power divider including one input port and four output ports according to an embodiment of the disclosure may include: an input-terminal inductor configured to have one end connected to the input port and another end connected to a ground; an inductor group configured to include four output-terminal inductors; and four connectors configured to connect the input port and the inductor group, wherein the four secondary inductors may be respectively connected to the four connectors so that four nodes are formed between the four connectors and the inductor group, and the output ports may be respectively disposed in the four connectors between the input port and the inductor group.

An electronic device in a wireless communication system according to an embodiment of the disclosure may include: a wireless communication unit configured to include a phased array antenna and a power divider including one input port and four output ports; and a controller configured to control the wireless communication unit, wherein the power divider may include: an input-terminal inductor configured to have one end connected to the input port and another end connected to a ground; an inductor group configured to include four output-terminal inductors; and four connectors configured to connect the input port and the inductor group, the four secondary inductors may be respectively connected to the four connectors so that four nodes are formed between the four connectors and the inductor group, and the output ports may be respectively disposed in the four connectors between the input port and the inductor group.

Advantageous Effects of Invention

According to an embodiment of the disclosure, there is provided a circuit structure for reducing the amount of space occupied by inductors, thereby making it possible to configure a power divider and combiner that achieve performance similar to a conventional power divider and combiner despite having a smaller size.

MODE FOR THE INVENTION

Figure 1:
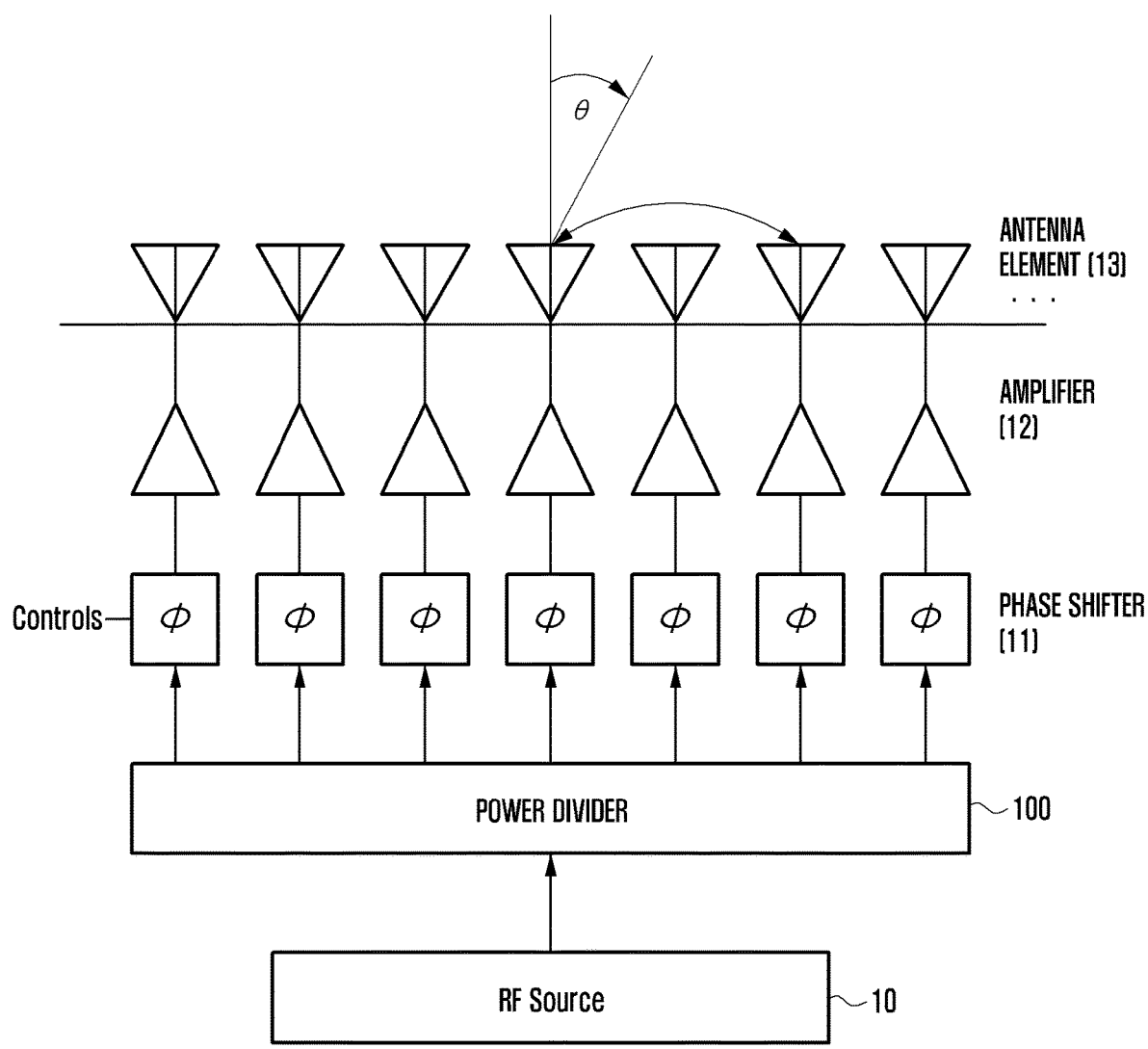
FIG. 1 illustrates a phased array system to which a power divider is applied according to an embodiment of the disclosure.

In describing the disclosure, a detailed description of known relevant functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Further, in the detailed description of embodiments of the disclosure, based on determinations by those skilled in the art, the main idea of the disclosure may be applied to other communication systems having similar technical backgrounds and channel types through some modifications without significantly departing from the scope of the disclosure.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors.

Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

FIG. 1 illustrates a phased array system to which a power divider is applied according to an embodiment of the disclosure.

A phased array system refers to a system including an antenna array that divides one signal into a plurality of signals and transmits the signals with different phases or in different directions or an antenna array that combines a plurality of signals from different directions into one signal and processes the signal. For example, a 5G system, which is a next-generation mobile communication system, can employ a phased array system to perform a beamforming operation or the like.

FIG. 1 illustrates an example of a phased array system including a power divider. As illustrated in FIG. 1, the phased array system may include an RF source 10 to generate and output an RF signal, a power divider 100 to divide and output power in order to convert a signal received from the RF source into signals having different phases, a phase shifter 11 to convert the phase of each signal using each output from the power divider 100, an amplifier 12 to amplify the output from the phase converter 11, and an antenna element 13 to output each amplified signal.

In the phased array system in which a plurality of RF paths is formed as illustrated in FIG. 1, the power divider 100 divides and outputs input power to signals output from the RF source 10 according to a predetermined ratio but needs to operate so that the signals are not affected by each other. In particular, a phased array system that communicates in a millimeter wave range needs a power divider that includes various components to operate so that signals do not affect each other but can be implemented in a small and integrated area.

Figure 2:
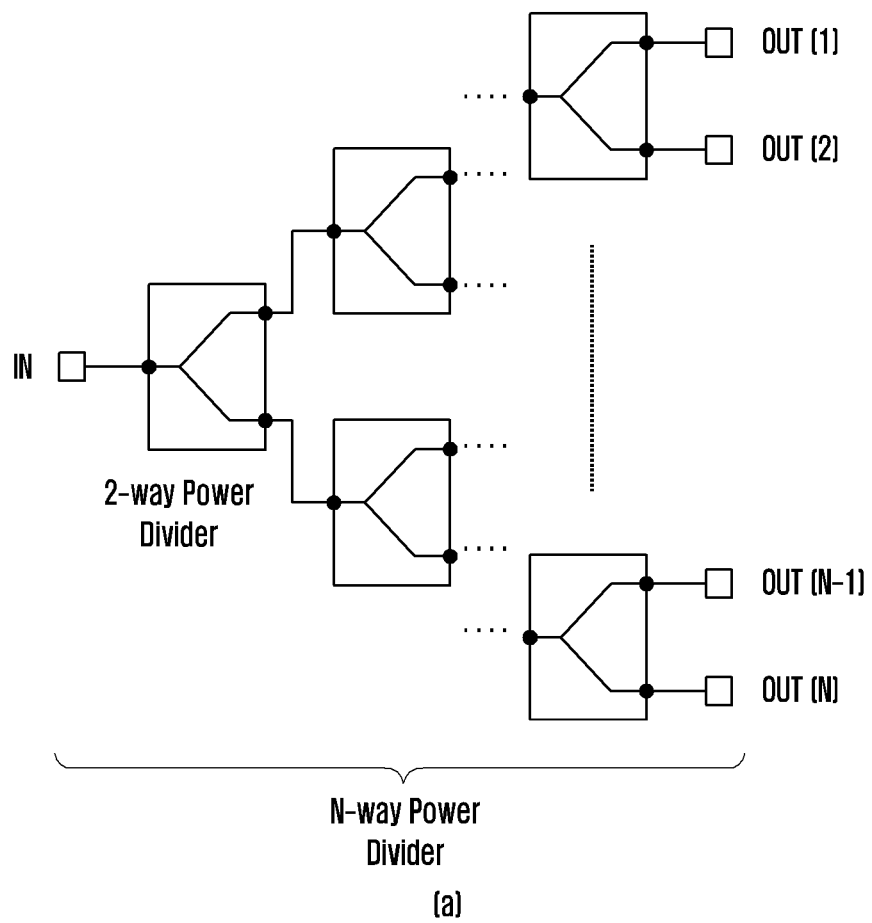
FIG. 2 illustrates the structure of a power divider that can be used in a phased array system.
Figure 2:
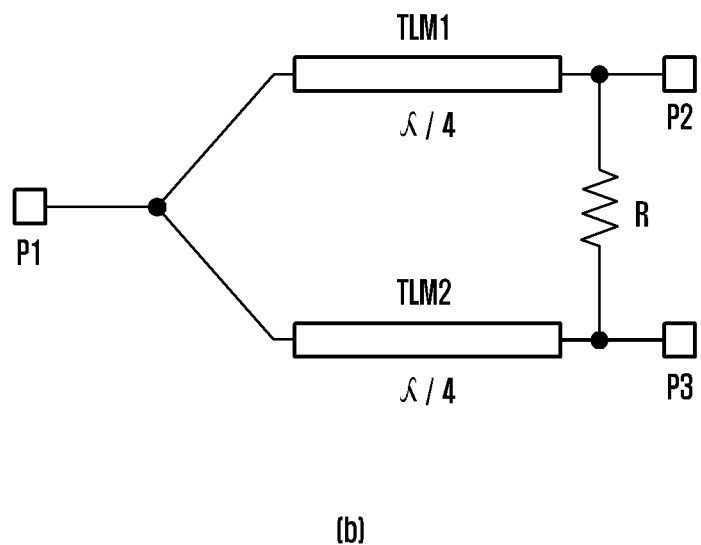

FIG. 2 illustrates the structure of a power divider that can be used in a phased array system.

In a phased array system using n antenna arrays, when a two-way power divider is used, a total of $\Sigma_{k=1}^{log_2 N} 2^{k-1}$ power dividers are required. For example, in a phased array system using 16 antenna arrays, 15 power dividers are required. Here, as the number of power dividers increases, the amount of space occupied by the power dividers greatly increases.

For example, when two-way power dividers are used for n antenna arrays, the two-way power dividers may be sequentially disposed as illustrated in (a) of FIG. 2. For example, as each of the two-way power dividers, a Wilkinson power divider may be used, as illustrated in (b) of FIG. 2.

Referring to (b) of FIG. 2, the Wilkinson power divider is a two-way power divider having one input port P1 and two output ports P2 and P3, the input port P1 and the output ports P2 and P3 being connected by transmission lines TLM1 and TLM2, and a resistor R being disposed between the two transmission lines. The length of each of the transmission lines TLM1 and TLM2 may be set to λ/4 when the operating frequency of a circuit is λ, and the resistor R may be implemented as 50 ohms by impedance matching to reduce the loss that occurs during signal transmission.

The Wilkinson power divider achieves high isolation between the two transmission lines but greatly increases the size of a circuit for a low-frequency signal due to use of a transmission line having a length of λ/4.

Figure 3:
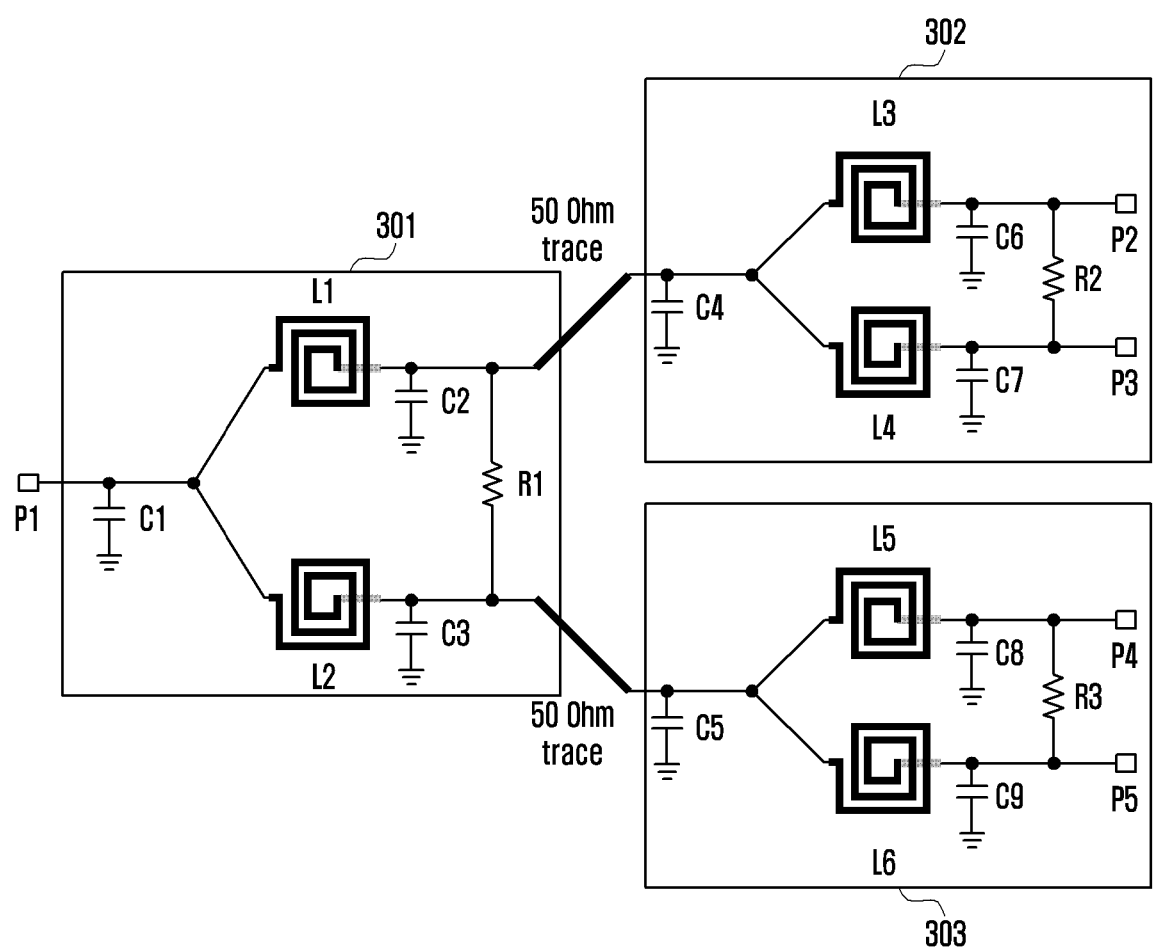
FIG. 3 illustrates an example of configuring a four-way power divider by sequentially disposing two-way power dividers.
Figure 4:
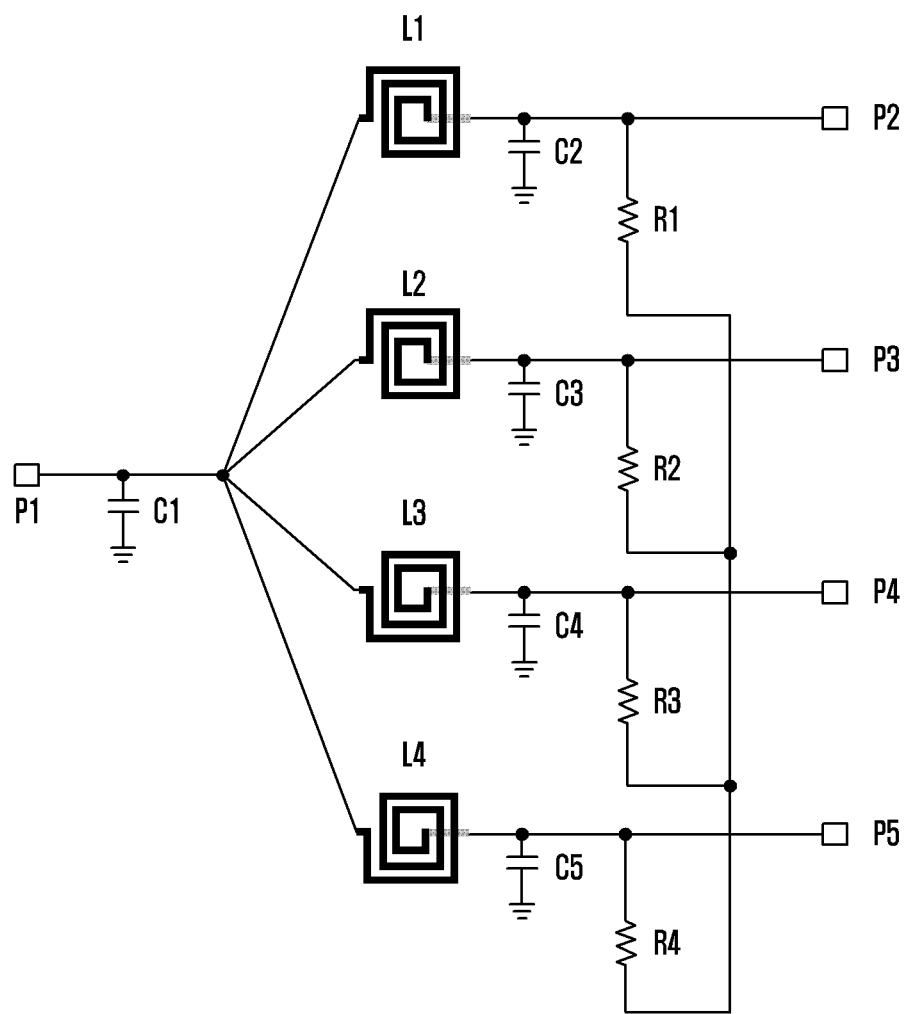
FIG. 4 illustrates an example of configuring a four-way power divider in which output ports are disposed in four directions from an input port.

FIG. 3 illustrates an example of configuring a four-way power divider by sequentially disposing two-way power dividers, and FIG. 4 illustrates an example of configuring a four-way power divider in which output ports are disposed in four directions from an input port.

In order to configure a more compact structure than the Wilkinson power divider, a technique for configuring a power divider through a capacitor-inductor-capacitor (CLC) arrangement or an inductor-capacitor-inductor (LCL) arrangement is introduced. A method for configuring a four-way power divider through a CLC or LCL arrangement is illustrated as follows.

Referring to FIG. 3, a two-way power divider 301 may be included in an input port, and two two-way power dividers may be sequentially connected to respective output terminals of the two-way power divider 301. That is, the two-way power divider 301 may be connected to the input port P1, a two-way power divider 302 may be connected to one output terminal of the connected two-way power divider 301, and a two-way power divider 303 may sequentially be connected to another output terminal thereof. Each of the two-way power dividers 301, 302, and 303 has a CLC structure including elements of a capacitor, an inductor, and a capacitor. Further, the respective two-way power dividers 301, 302, and 303 have resistors R1, R2, and R3 connected to separate lines in two directions from each other.

When the four-way power divider is formed as described above, the size of the four-way power divider is greatly increased due to the size of the inductor included in each line. In particular, as illustrated in FIG. 3, when the four-way power divider is configured with the three two-way power dividers, a total of six inductors are included, and thus the size of the four-way power divider may greatly increase.

Referring to FIG. 4, the four-way power divider is configured so that four output ports P2, P3, P4, and P5 are directly connected to one input port P1 without using two-way power dividers. The power divider of FIG. 4 is also configured in a CLC structure in which a capacitor, an inductor, and a capacitor are included in each line connecting an input terminal and an output terminal, as shown in FIG. 3.

In the power divider configured as shown in FIG. 4, since the number of inductors included in the power divider is smaller than that in FIG. 3, the power divider may be configured in a smaller size than the power divider configured as shown in FIG. 3. However, the inductors are disposed parallel to each other considering isolation between lines, thus making it difficult to configure a power divider having a size smaller than a certain size.

Accordingly, an embodiment of the disclosure proposes a power divider and a power combiner that can be configured to have a compact size by proposing a specific arrangement structure of inductors. Hereinafter, for convenience of explanation, a structure will be described with a focus on the power divider. Here, since the power divider can be used as a power combiner by switching each output port into an input port and switching an input port into an output port, it is preferable to assume that the structure proposed in the disclosure is applied to a power combiner.

Figure 5:
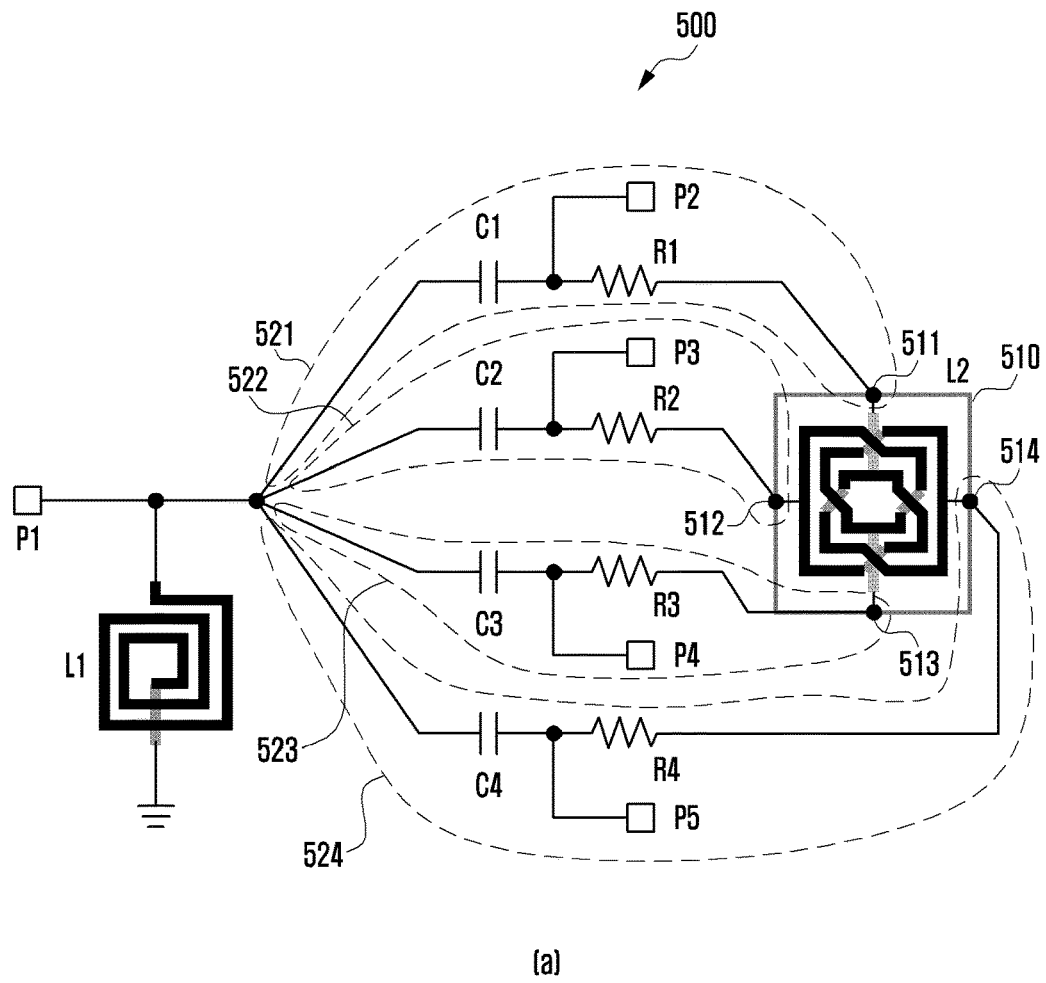
FIG. 5 illustrates the connection relationship between components included in a four-way power divider according to an embodiment of the disclosure.
Figure 5:
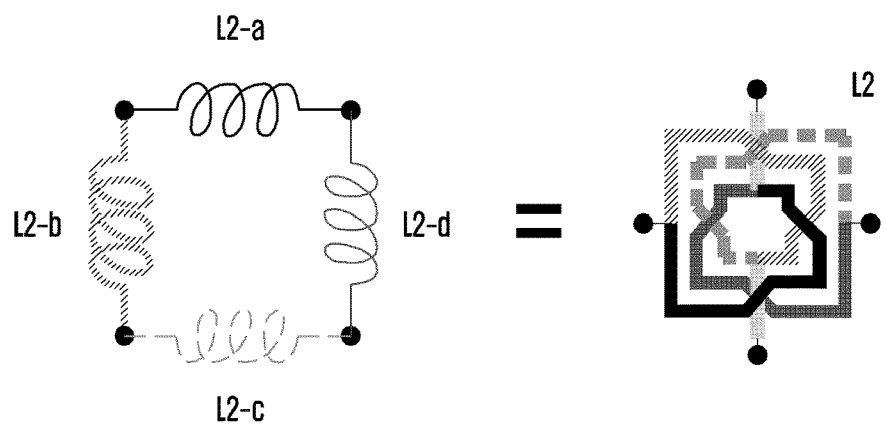
Figure 6:
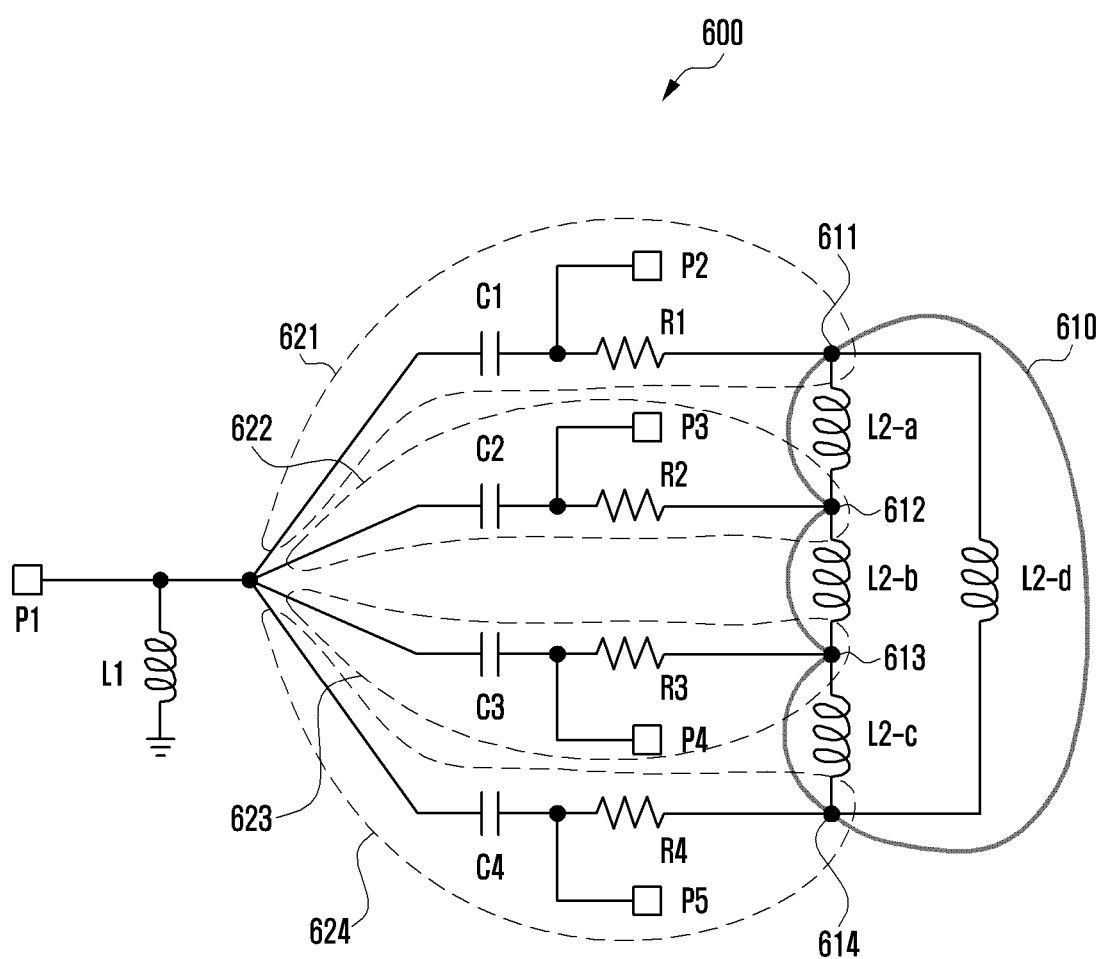
FIG. 6 is a circuit diagram illustrating the structure of the power divider illustrated in FIG. 5.

FIG. 5 illustrates the connection relationship between components included in a four-way power divider according to an embodiment of the disclosure, and FIG. 6 is a circuit diagram illustrating the structure of the power divider illustrated in FIG. 5.

Referring to (a) of FIG. 5, the four-way power divider 500, configured to include one input port P1 and four output ports P4 according to an embodiment of the disclosure, may include one inductor L1 at an input terminal and an inductor group 510 including four inductors L2-a, L2-b, L2-c, and L2-d disposed in a specific structure at an output terminal.

Here, as illustrated in (b) of FIG. 5, the four inductors L2-a, L2-b, L2-c, and L2-d included in the inductor group 510 may be cyclically connected to form one closed circuit. That is, the four inductors L2-a, L2-b, L2-c, and L2-d may be disposed to have a structure in which both ends of one inductor are connected to one ends of the respective inductors so that a total of four nodes are formed.

Referring back to (a) of FIG. 5, the power divider 500 according to an embodiment of the disclosure may include the inductor L1 at the input terminal having one end connected to the input port P1 and another end connected to the ground, the inductor group 510 including the four inductors L2-*a*, L2-*b*, L2-*c*, and L2-*d* disposed in the above structure, and four connectors 521, 522, 523, and 524 to connect the input port P1 and the inductor group 510.

The four inductors L2-*a*, L2-*b*, L2-*c*, and L2-*d* having the above structure may be respectively connected to the four connectors 521, 522, 523, and 524 so that four nodes 511, 512, 513, and 514 are formed between the inductor group 510 and the four connectors 521, 522, 523, and 524. The four output ports P2, P3, P4, and P5 may be respectively disposed in the four connectors 521, 522, 523, and 524 between the input port P1 and the inductor group 510.

Specifically, referring to FIG. 6, the power divider 600 according to an embodiment of the disclosure may include a first connector 621, in which a first output port P2 is disposed between the input port P1 and the inductor group 610, a second connector 622, in which a second output port P3 is disposed between the input port P1 and the inductor group 610, a third connector 623, in which a third output port P4 is disposed between the input port P1 and the inductor group 610, and a fourth connector 624, in which a fourth output port P5 is disposed between the input port P1 and the inductor group 610.

Here, the four inductors L2-*a*, L2-*b*, L2-*c*, and L2-*d* included in the inductor group 610 according to an embodiment of the disclosure may be connected to the connectors so that four nodes 611, 6112, 613, and 614 are formed between the inductor group 610 and the first to fourth connectors 621, 622, 623, and 624.

If the four inductors L2-*a*, L2-*b*, L2-*c*, and L2-*d* are a first inductor L2-*a*, a second inductor L2-*b*, a third inductor L2-*c*, and a fourth inductor L2-*d*, the first inductor L2-*a* may have both ends respectively connected to a first node 611 between the first connector 621 and the inductor group 610 and a second node 612 between the second connector 622 and the inductor group 610, as illustrated in FIG. 6. The second inductor L2-*b* may have both ends respectively connected to the second node 612 and a third node 613 between the third connector 623 and the inductor group 610. The third inductor L2-*c* may have both ends respectively connected to the third node 613 and a fourth node 614 between the fourth connector 624 and the inductor group 610. The fourth inductor L2-*d* may have both ends respectively connected to the fourth node 614 and the first node 611.

A capacitor and a resistor for power division may be disposed in each of the four connectors 621, 622, 623, and 624 of the power divider according to an embodiment of the disclosure. Specifically, a first capacitor C1 may be disposed in the first connector 621, and a first resistor R1 may be disposed between the first capacitor C1 and the first node 611 in the first connector 621. A second capacitor C2 may be disposed in the second connector 622, and a second resistor R2 may be disposed between the second capacitor C2 and the second node 612 in the second connector 622. Likewise, a third resistor R3 may be disposed between a third capacitor C3 and the third node 613 in the third connector 623, and a fourth resistor R4 may be disposed between a fourth capacitor C4 and the fourth node 614 in the fourth connector 624.

When the four inductors disposed at the output terminal are configured according to the foregoing arrangement method, the amount of space occupied by the inductors is significantly reduced compared to the case in which the inductors are independently disposed in the respective connectors. That is, this arrangement method enables the power divider according to an embodiment of the disclosure to have a more compact structure.

In the power divider according to an embodiment of the disclosure, the inductor disposed at the input terminal and the four inductors disposed at the output terminal may be configured according to different quality factors (Q). For example, in the power divider according to an embodiment of the disclosure, each of the four inductors disposed at the output terminal may be configured to have a Q value smaller than that of the inductor disposed at the input terminal. Specifically, in a wavelength band from 20 to 30 GHz, the inductor at the input terminal may be configured to have a Q value of about 15, and the inductors at the output terminal may be configured to have a smaller Q value, which is about 10.

Even when inductors having a low Q value are used, the four inductors at the output terminal in the power divider according to an embodiment of the disclosure may be disposed according to the foregoing specific structure, thereby having performance similar to that of a conventional power divider. In an embodiment, all four inductors may have the same Q value or different Q values. However, in consideration of an aspect of the disclosure, it is assumed in the embodiment disclosed herein that all four inductors have the same Q value.

The power divider according to the embodiment of the disclosure described above has a structure in which the four inductors at the output terminal are connected to each other so that the four nodes are formed, thus increasing the efficiency of use of space compared to a conventional arrangement method by which each inductor is independently disposed.

Further, an inductor having a high Q factor but having a large size is conventionally used in order to ensure the performance of the inductor, thus causing an increase in the size of a power divider. However, according to the disclosure, inductors having a low Q factor are disposed as the four inductors at the output terminal, thereby enabling a more compact structure.

Figure 7:
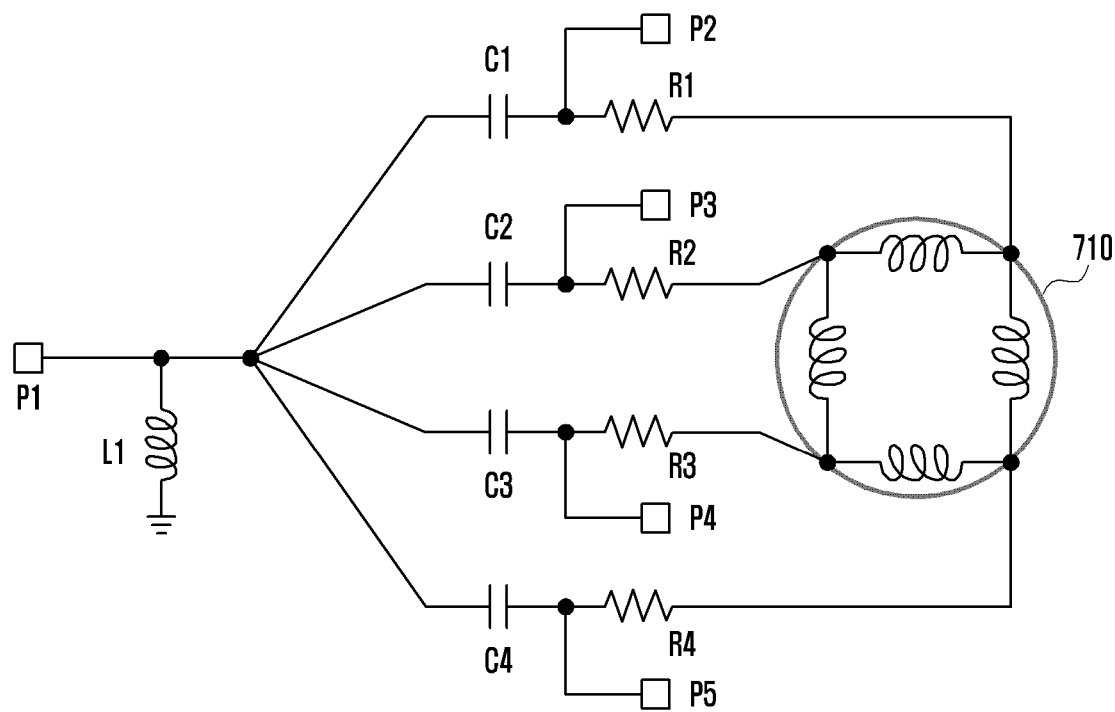
FIG. 7 is a circuit diagram illustrating an exemplary configuration of a power divider according to an embodiment of the disclosure.
Figure 8:
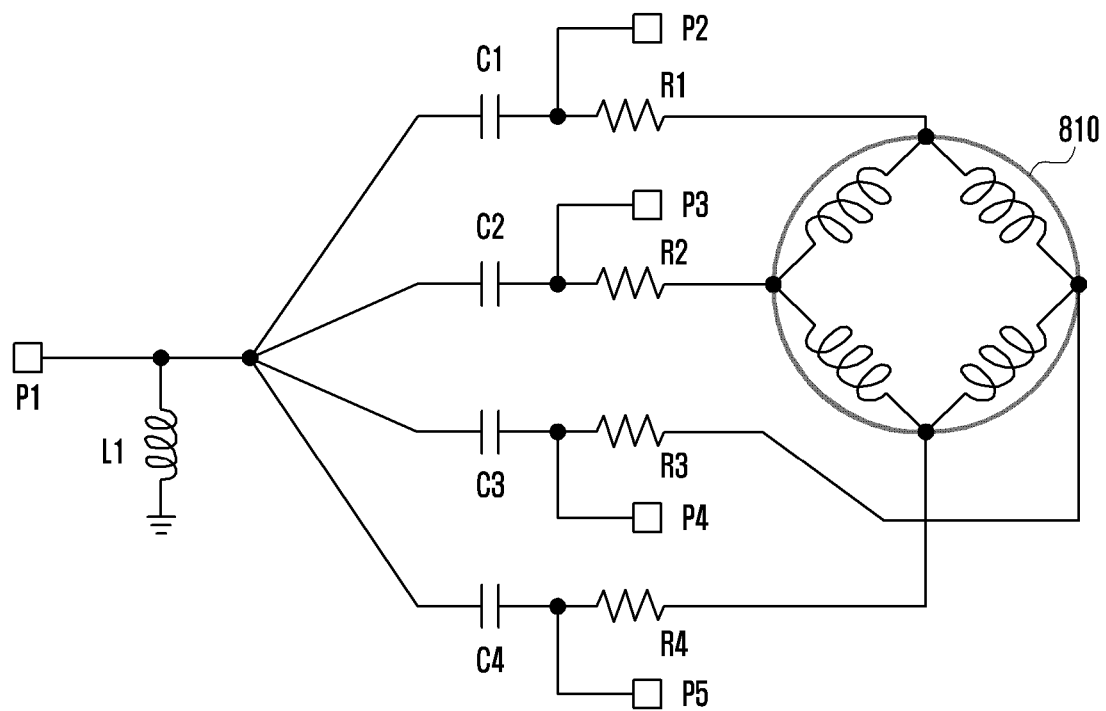
FIG. 8 is a circuit diagram illustrating an exemplary configuration of configuring a power divider according to an embodiment of the disclosure.

FIG. 7 and FIG. 8 are circuit diagrams illustrating exemplary configurations of a power divider according to an embodiment of the disclosure.

Referring to FIG. 7 and FIG. 8, inductor groups 710 and 810 may be disposed in power dividers as shown in the drawings. The circuit diagrams illustrated in FIG. 7 and FIG. 8 show the same structure as that of the power divider illustrated in FIG. 6, and thus a redundant description will be omitted.

Figure 9:
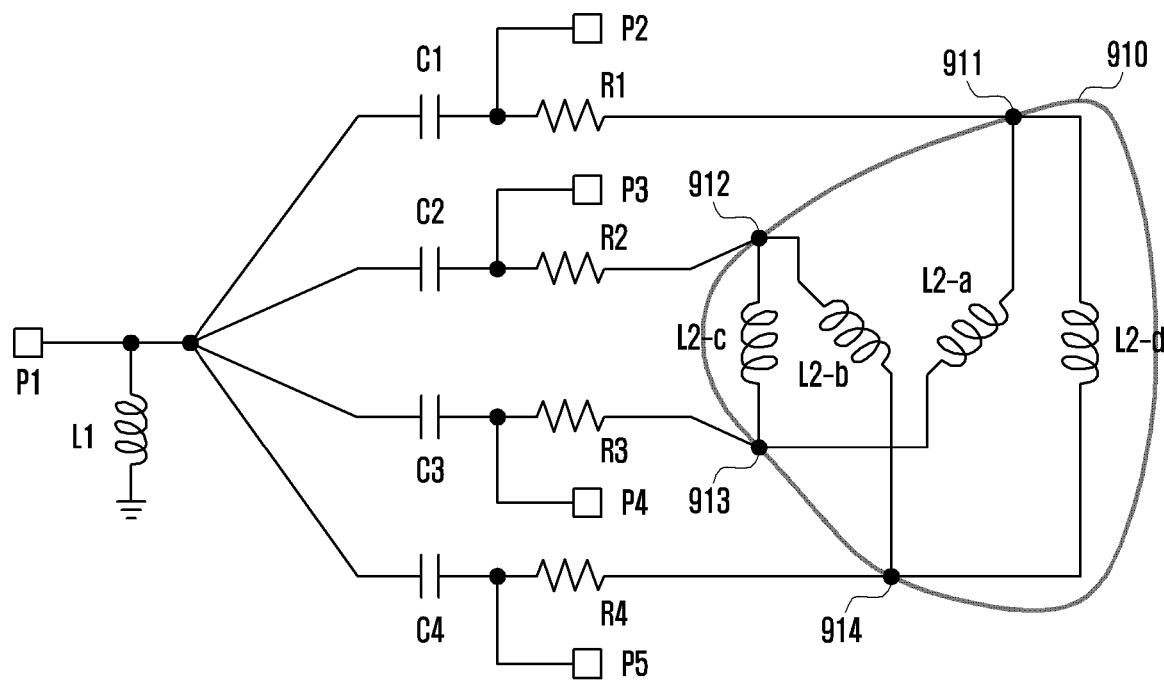
FIG. 9 is a circuit diagram illustrating the structure of a power divider according to an embodiment of the disclosure.

FIG. 9 is a circuit diagram illustrating the structure of a power divider according to an embodiment of the disclosure.

Since the circuit diagram illustrated in FIG. 9 shows a structure similar to that of the power dividers illustrated in FIG. 6 to FIG. 8, a redundant description of the structure will be omitted.

Referring to FIG. 9, the power divider according to an embodiment of the disclosure may include an inductor group 910 including four inductors L2-*a*, L2-*b*, L2-*c*, and L2-*d* at an output terminal. When the four inductors L2-*a*, L2-*b*, L2-*c*, and L2-*d* included in the inductor group 910 are, for example, a first inductor L2-*a*, a second inductor L2-*b*, a third inductor L2-*c*, and a fourth inductor L2-*d*, the four inductors L2-*a*, L2-*b*, L2-*c*, and L2-*d* may be connected to individual connectors to form four nodes, as illustrated in the above drawings.

However, in the embodiment of FIG. 9, the first inductor L2-*a* may be connected to a first node 911 and to a third node 913, the second inductor L2-*b* may be connected to a second node 912 and to a fourth node 914, the third inductor L2-*c* may be connected to the third node 913 and to the second node 912, and the fourth inductor L2-*d* may be connected to the fourth node 914 and to the first node 911.

Even though the inductors are connected as described above, the power divider may be configured with a smaller size according to the foregoing specific arrangement of the inductors.

Figure 10:
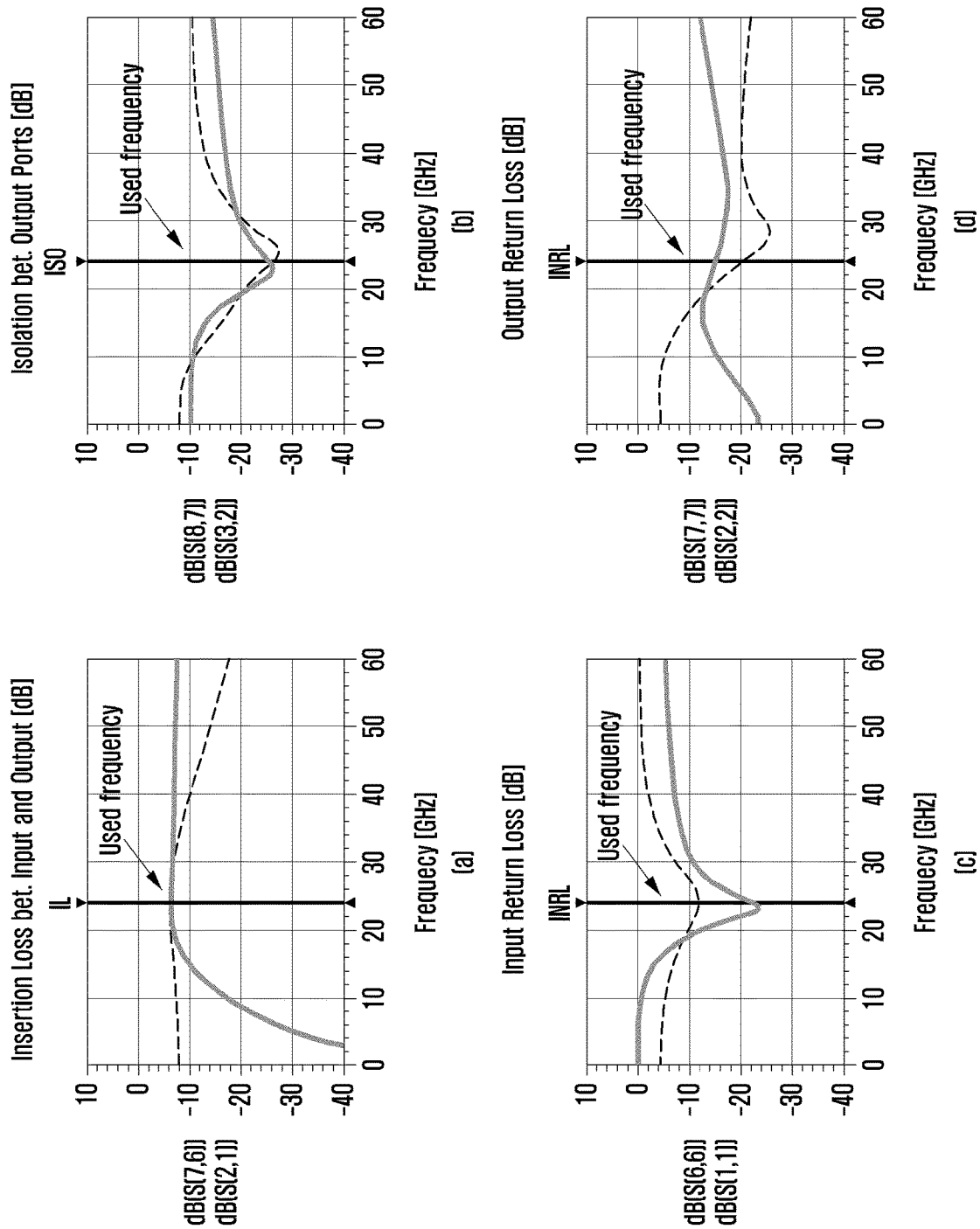
FIG. 10 illustrates the results of comparing the performance of a power divider according to an embodiment of the disclosure with the performance of a conventional power divider.

FIG. 10 illustrates the results of comparing the performance of a power divider according to an embodiment of the disclosure with the performance of a conventional power divider.

FIG. 10 shows various performance values of the power dividers based on a frequency domain that is used. The used frequency domain is, for example, 24 GHz, the solid line shows the result value of the power divider according to the embodiment of the disclosure, and the dotted line shows the result value of the conventional power divider (e.g., the power divider illustrated in FIG. 4).

Part (a) of FIG. 10 shows the results of measurement of loss, based on an output signal output in response to an input signal. As shown in part (a) of FIG. 10, the power divider according to the disclosure and the conventional power divider exhibits the same loss value in the used frequency domain.

Part (b) of FIG. 10 shows result values showing whether lines connecting an input port and output ports are properly isolated. Referring to part (b) of FIG. 10, the values are slightly different in areas near a used frequency but are the same in the used frequency domain.

Part (c) of FIG. 10 shows loss values depending on the return of an input signal. As shown in part (c) of FIG. 10, the power divider according to the disclosure exhibits less loss in the used frequency domain.

Part (d) of FIG. 10 shows loss values depending on the return of an input signal when input and output ports of the power dividers are switched to configure power combiners. Referring to part (d) of FIG. 10, the performance of the power combiner according to the disclosure is slightly lower than that of the conventional power combiner in the used frequency domain but is a value smaller than −10 dB, which is a criterion for determining performance deterioration, thus indicating that the power combiner according to the disclosure does not show a remarkable difference in performance from a conventional power combiner.

As described above, according to an embodiment of the disclosure, even when inductors having a low Q factor are used, a circuit may be configured through a specific arrangement structure of the inductors, thereby decreasing the volume of a power divider or a power combiner and securing the performance thereof.

Figure 11:
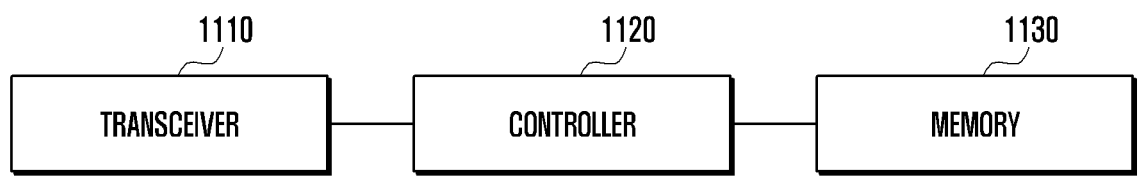
FIG. 11 is a block diagram illustrating the configuration of an electronic device including a power divider or combiner according to an embodiment of the disclosure.

FIG. 11 is a block diagram illustrating the configuration of an electronic device including a power divider or combiner according to an embodiment of the disclosure.

Referring to FIG. 11, an electronic device according to an embodiment of the disclosure may include a transceiver 1110, a controller 1120, and a memory 1130. For example, the electronic device may be a portable terminal, a vehicle, a base station, or the like capable of performing wireless communication.

The transceiver 1110 according to an embodiment of the disclosure may include phased array antennas according to an embodiment of the disclosure and a power divider that divides power to enable signal transmission and reception using the phased array antennas. The power divider may have a structure according to the foregoing examples.

The controller 1120 according to an embodiment of the disclosure may control the transceiver 1110 to transmit and receive a signal to and from an external device through wireless communication. In addition, the controller 1120 according to an embodiment of the disclosure may process a signal transmitted and received through the transceiver 1110 and may control the components included in the electronic device to perform a corresponding operation.

The memory 1130 according to an embodiment of the disclosure may store information transmitted or received through the transceiver 1110 or information generated by the controller 1120.

Those skilled in the art will appreciate that other particular embodiments of the disclosure may be implemented without making changes to the technical idea and essential features of the disclosure. Therefore, the embodiments disclosed herein should be considered not from limitative viewpoints but from illustrative viewpoints in all aspects. The scope of the disclosure should be determined not by the above description but by the appended claims, and all modifications and changes derived from the meaning and scope of the claims and concepts equivalent to the claims shall be construed as falling within the scope of the disclosure.

Although exemplary embodiments of the disclosure have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants may be achieved on the basis of the technical idea of the disclosure.

The invention claimed is:

1. A power divider comprising one input port and four output ports, the power divider comprising:
 an input-terminal inductor configured to have one end connected to the input port and another end connected to a ground;
 an inductor group configured to comprise four output-terminal inductors; and
 four connectors configured to connect the input port and the inductor group,
 wherein the output-terminal inductors are respectively connected to the four connectors so that four nodes are formed between the four connectors and the inductor group,
 wherein the output ports are respectively disposed in the four connectors between the input port and the inductor group, and
 wherein a value of a quality factor of the input-terminal inductor is greater than a value of each quality factor of the output-terminal inductors.

2. The power divider of claim 1,
 wherein the four connectors comprise a first connector, a second connector, a third connector, and a fourth connector,
 wherein the four nodes comprise a first node formed in the first connector, a second node formed in the second connector, a third node formed in the third connector, and a fourth node formed in the fourth connector, and
 wherein the power divider further comprises:
 a first capacitor disposed between the input port and the first node in the first connector,
 a second capacitor disposed between the input port and the second node in the second connector,
 a third capacitor disposed between the input port and the third node in the third connector, and
 a fourth capacitor disposed between the input port and the fourth node.

3. The power divider of claim 2,
wherein the four output-terminal inductors comprise a first inductor, a second inductor, a third inductor, and a fourth inductor,
wherein the first inductor connects between the first node and the second node,
wherein the second inductor connects between the second node and the third node,
wherein the third inductor connects between the third node and the fourth node, and
wherein the fourth inductor connects between the fourth node and the first node.

4. The power divider of claim 2,
wherein the four output-terminal inductors comprise a first inductor, a second inductor, a third inductor, and a fourth inductor,
wherein the first inductor connects between the first node and the third node,
wherein the second inductor connects between the second node and the fourth node,
wherein the third inductor connects between the third node and the second node, and
wherein the fourth inductor connects between the fourth node and the first node.

5. The power divider of claim 2, further comprising:
a first resistor disposed between the first capacitor and the first node;
a second resistor disposed between the second capacitor and the second node;
a third resistor disposed between the third capacitor and the third node; and
a fourth resistor disposed between the fourth capacitor and the fourth node.

6. The power divider of claim 1,
wherein the quality factor of the input-terminal inductor has a value of 15, and
wherein the quality factor of the output-terminal inductors has a value of 10.

7. An electronic device in a wireless communication system, the electronic device comprising:
a transceiver configured to comprise a phased array antenna and a power divider comprising one input port and four output ports; and
a controller configured to control the transceiver,
wherein the power divider comprises:
an input-terminal inductor configured to have one end connected to the input port and another end connected to a ground,
an inductor group configured to comprise four output-terminal inductors, and
four connectors configured to connect the input port and the inductor group,
wherein the output-terminal inductors are respectively connected to the four connectors so that four nodes are formed between the four connectors and the inductor group,
wherein the output ports are respectively disposed in the four connectors between the input port and the inductor group, and
wherein a value of a quality factor of the input-terminal inductor is greater than a value of each quality factor of the output-terminal inductors.

8. The electronic device as claimed in claim 7,
wherein the four connectors comprise a first connector, a second connector, a third connector, and a fourth connector,
wherein the four nodes comprise a first node formed in the first connector, a second node formed in the second connector, a third node formed in the third connector, and a fourth node formed in the fourth connector, and
wherein the power divider further comprises:
a first capacitor disposed between the input port and the first node in the first connector,
a second capacitor disposed between the input port and the second node in the second connector,
a third capacitor disposed between the input port and the third node in the third connector, and
a fourth capacitor disposed between the input port and the fourth node.

9. The electronic device as claimed in claim 8,
wherein the four output-terminal inductors comprise a first inductor, a second inductor, a third inductor, and a fourth inductor,
wherein the first inductor connects between the first node and the second node,
wherein the second inductor connects between the second node and the third node,
wherein the third inductor connects between the third node and the fourth node, and
wherein the fourth inductor connects between the fourth node and the first node.

10. The electronic device as claimed in claim 8,
wherein the four output-terminal inductors comprise a first inductor, a second inductor, a third inductor, and a fourth inductor,
wherein the first inductor connects between the first node and the third node,
wherein the second inductor connects between the second node and the fourth node,
wherein the third inductor connects between the third node and the second node, and
wherein the fourth inductor connects between the fourth node and the first node.

11. The electronic device as claimed in claim 8, further comprising:
a first resistor disposed between the first capacitor and the first node;
a second resistor disposed between the second capacitor and the second node;
a third resistor disposed between the third capacitor and the third node; and
a fourth resistor disposed between the fourth capacitor and the fourth node.

12. The electronic device as claimed in claim 7,
wherein the quality factor of the input-terminal inductor has a value of 15, and
wherein the quality factor of the output-terminal inductors has a value of 10.

* * * * *